United States Patent Office 3,782,935
Patented Jan. 1, 1974

3,782,935
NOVEL TETRANUCLEAR METHINE DYES, PROCESSES FOR PREPARING THE SAME, AND ELECTROPHOTOGRAPHIC SYSTEMS AND SILVER HALIDE EMULSIONS CONTAINING THE SAME
Shi-Kuang Yao, Binghamton, N.Y., assignor to GAF Corporation, New York, N.Y.
No Drawing. Original application May 13, 1968, Ser. No. 728,837, now Patent No. 3,687,946. Divided and this application May 12, 1972, Ser. No. 252,912
Int. Cl. G03g 5/06, 5/08
U.S. Cl. 96—1.7                                                 6 Claims

ABSTRACT OF THE DISCLOSURE

Novel tetranuclear dyes useful as sensitizers in electrophotographic systems as well as silver halide emulsions comprise compounds of the formula:

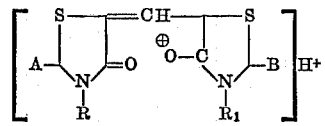

wherein

A is selected from the group consisting of (1)

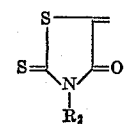

(2)

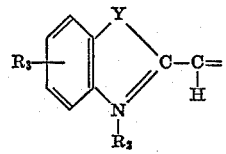

and (3) O=

B is selected from the group consisting of (1), (2) and (4)

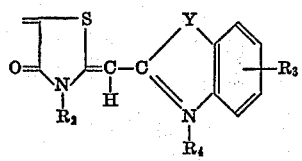

R is alkyl;
$R_1$, $R_2$ and $R_4$ are selected from the group consisting of alkyl and carboxyalkyl;
$R_3$ is selected from the group consisting of hydrogen, alkyl and alkoxy; and
Y is selected from the group consisting of Se and S;
such compounds being characterized that when A is (1), B is (1); when A is (2), B is (2) and when A is (3), B is (4).

Processes of producing such dyes as well as electrophotographic processes and materials containing the same are provided.

This is a division of application Ser. No. 728,837, filed May 13, 1968, now U.S. Pat. 3,687,946.

The present invention relates to novel tetranuclear methine dyes and methods of preparing the same as well as electrophotographic systems and silver halide emulsions containing such tetranuclear dyes as dyestuff sensitizers.

It has now been discovered in accordance with the present invention that certain novel tetranuclear dyes possess excellent properties as dyestuff sensitizers both in electrophotographic processes and compositions as well as silver halide emulsions.

Thus, in accordance with the present invention, it has been discovered that certain novel methine tetarnuclear dyes are capable of sensitizing the photoconductive insulating layer of both liquid toning and dry toning electrophotographic systems so as to increase the sensitivity of such layer by at least 50% while eliminating the effect of background bleaching or fading upon prolonged exposures associated with the use of conventional dyestuff sensitizers generally employed in electrophotographic processes and products.

Therefore, it is a principal object of the present invention to provide novel tetranuclear methine dyes and processes of producing the same.

It is a further object of the present invention to provide such tetranuclear dyes wherein such dyes are useful as dyestuff sensitizers for photoconductive materials employed in electrophotographic and in photographic silver halide emulsion.

It is yet a further object of the present invention to provide electrophotographic systems including processes of electrophotographic reproduction and materials employed therein wherein the novel tetranuclear methine dyes of the present invention are utilized as dyestuff sensitizers effecting a greater than 50% sensitizing of the photoconductive material with an elimination of the effect of background bleaching or fading associated with conventionally employed materials.

Still further objects and advantages of the compounds, compositions and processes of the present invention will become more apparent from the following more detailed description thereof.

The novel tetranuclear dyes of the present invention correspond to the general formula:

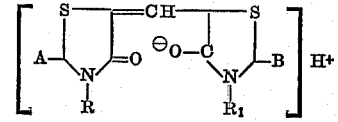

wherein

A is selected from the group consisting of (1)

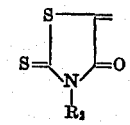

(2)

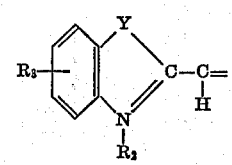

and (3)  O=

B is selected from the group consisting of (1), (2) and (4)

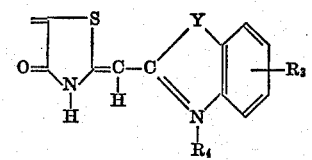

R is alkyl;
$R_1$, $R_2$ and $R_4$ are selected from the group consisting of alkyl and carboxyalkyl;

$R_3$ is selected from the group consisting of hydrogen, alkyl and alkoxy; and
Y is selected from the group consisting of Se and S;

such compounds being characterized that when A is (1), B is (1); when A is (2), B is (2) and when A is (3), B is (4).

Suitable alkyl radicals generally include those having from about one to about 20 carbon atoms, the lower alkyl radicals of from one to six carbon atoms being preferred. Rrepresentative alkyl groups include for example:

| | |
|---|---|
| methyl | n-heptyl |
| ethyl | 1-methylhexyl |
| n-propyl | n-octyl |
| iso-propyl | iso-octyl |
| n-butyl | n-dodecyl |
| t-butyl | n-tetradecyl |
| n-amyl | n-hexadecyl |
| iso-amyl | n-octadecyl |
| n-hexyl | eicosyl, etc. |

Similarly, suitable carboxy alkyl radicals which can be employed in accordance with the present invention are those which contain from one to about 20 carbon atoms in the alkyl chain. Again, the carboxy lower alkyl group containing from one to about 6 carbon atoms in the lower alkyl chain are preferred. Illustrative carboxy alkyl groups employed in accordance with the present invention include:

| | |
|---|---|
| carboxy methyl | carboxy octyl |
| carboxy ethyl | carboxy dodecyl |
| carboxy propyl | carboxy hexadecyl |
| carboxy butyl | carboxy octadecyl, etc. |
| carboxyl hexyl | |

In addition, suitable alkoxy substituents are those which contain from one to about six carbon atoms, i.e., lower alkoxy. Representative examples of such alkoxy substituents include:

| | |
|---|---|
| methoxy | propoxy |
| ethoxy | n-butoxy |
| isopropoxy | t-butoxy, etc. |

The above identified tetranuclear dyes are prepared by reacting a di-quaternated salt of the general formula:

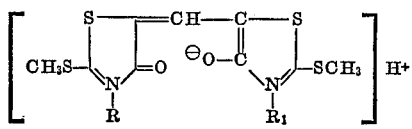

with a compound selected from the formulae:

(A)

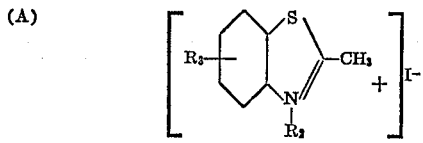

or (B)

to yield compounds of the formulae:

(A)

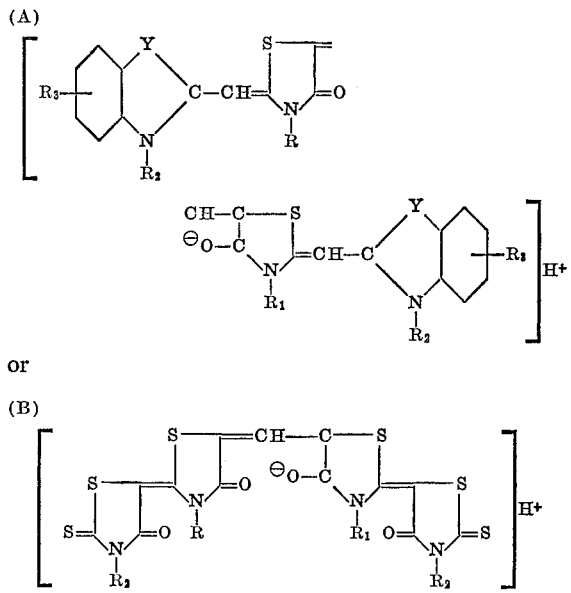

or (B)

Generally, such a process is carried out by reacting approximately two moles of Compound A or two moles of Compound B per mole of the di-quaternated salt in order to produce the novel tetranuclear dye. The employment of greater amounts of Compound A or Compound B in the reaction with the di-quaternated salt, however, will not detract from the yield or purity of the desired tetranuclear dye but will only necessitate the removal of the excess reactant after completion of the reaction.

The temperature employed in the reaction in the production of the novel tetranuclear dyes in accordance with the present invention is in no way critical, the reaction proceeding successfully from temperatures ranging from ambient temperatures to highly elevated temperatures. Generally, however, temperatures within the range of 20° C. to 135° C. are preferred. Similarly, the pressure employed in the reaction of the present invention is in no way critical, and pressures ranging from sub-atmospheric pressure to highly elevated super-atmospheric pressures can be utilized.

The di-quaternated salts employed as a reactant in accordance with the process of the present invention in the production of the tetranuclear dyes are more fully described in co-pending application Ser. No. 717,896, filed Apr. 1, 1968, now U.S. Pat. 3,628,951. Thus, as disclosed in such co-pending application, the initial reactant in accordance with the process of the present invention comprises the unisolated intermediates produced from the quaternization of oxonols with transformation of the quaternary salts in aqueous alcohol or polar solvents to produce the di-quaternated salts corresponding to the general formula:

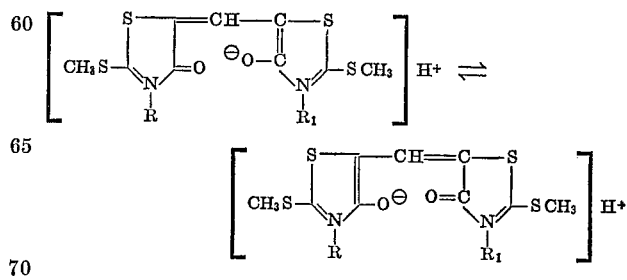

While the above discussion is based primarily on the production of symmetrical tetranuclear dyes in accordance with the present invention, it is also within the province of the present invention to produce unsymmetrical tetranuclear dyes.

Such unsymmetrical tetranuclear dyes are prepared by reacting a compound of the formula:

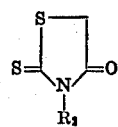

with a trinuclear compound of the formula:

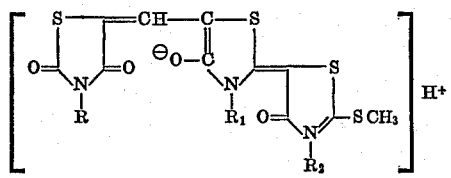

such compounds being reacted in substantially equimolar amounts so as to produce the desired tetranuclear dye. The trinuclear compounds which are employed as reactants in accordance with this embodiment to the present invention wherein unsymmetrical tetranuclear dyes are produced are the subject of applicant's co-pending application Ser. No. 717,896, now U.S. Pat. 3,628,951, application more fully discloses the preparation of such trinuclear compounds. Accordingly, the subject matter of applicant's co-pending application is herewith incorporated by reference as illustrating the preparation of the trinuclear reactant employed in the production of the tetranuclear dyes of the present invention.

Exemplary tetranuclear dyes falling within the general formula above include, for example:

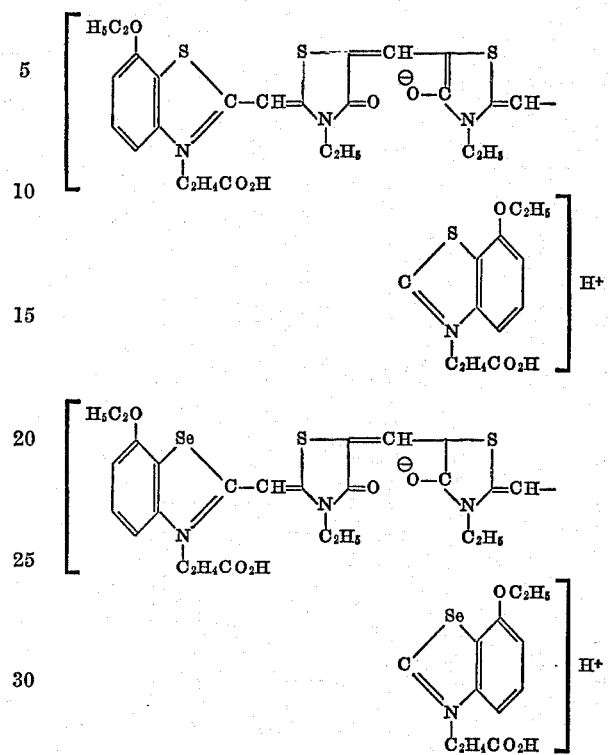

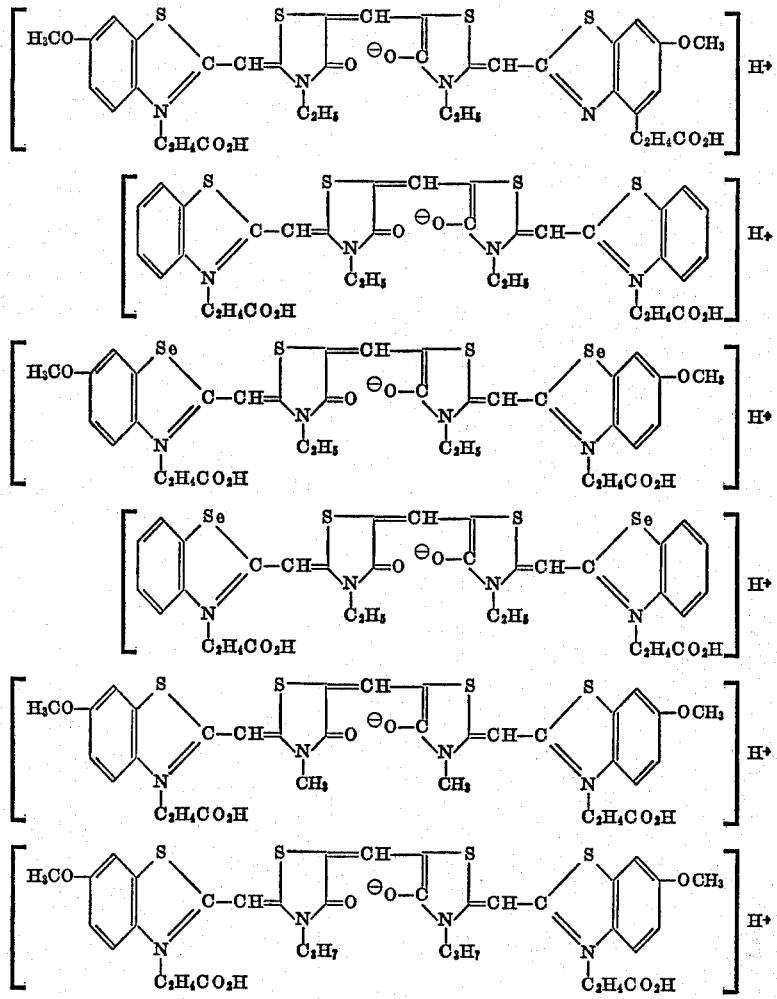

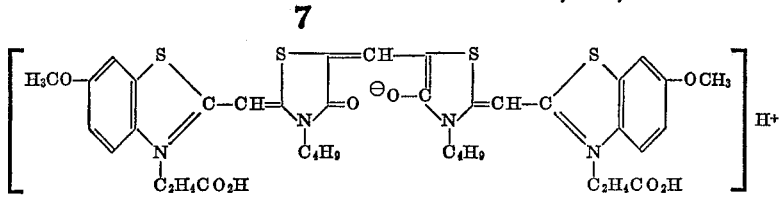
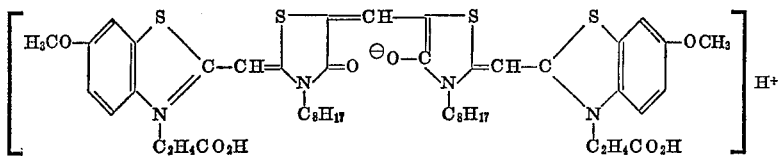
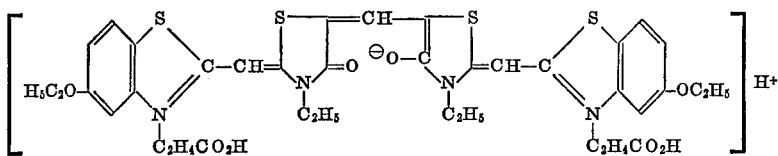
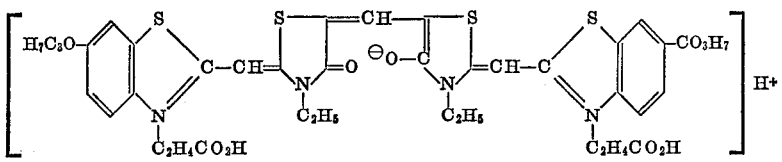
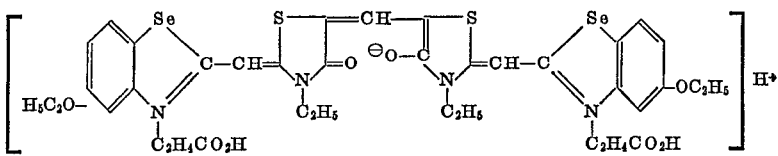
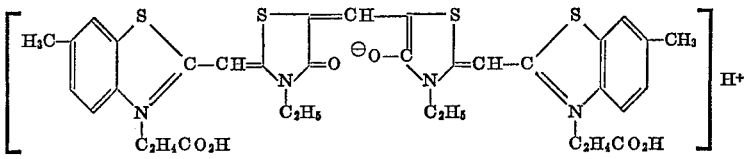
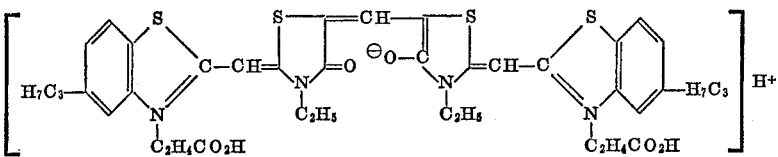
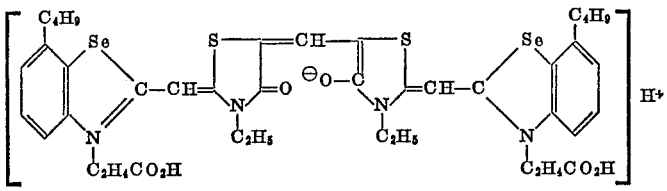
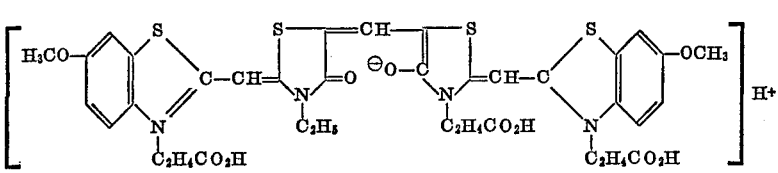
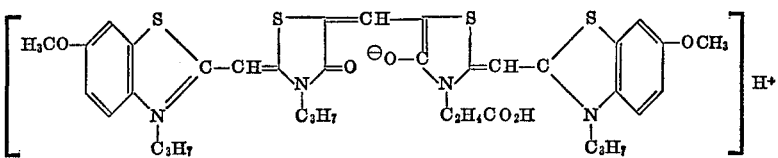

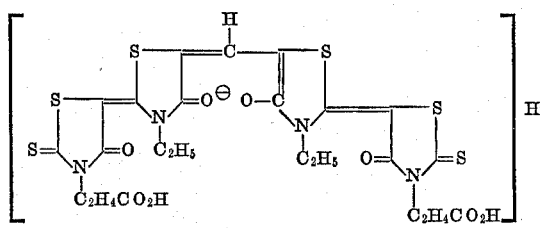
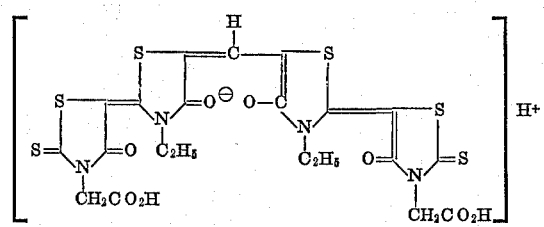
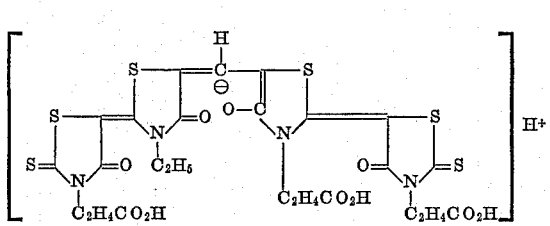
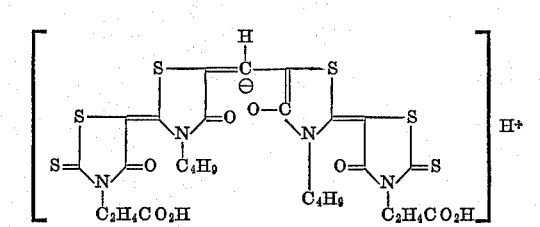
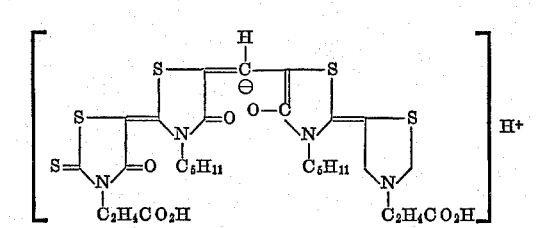
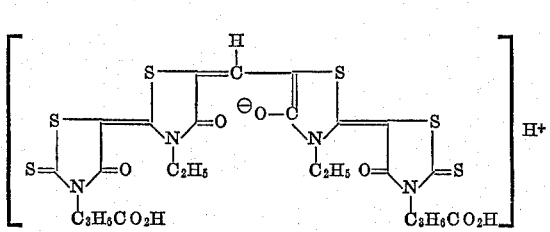
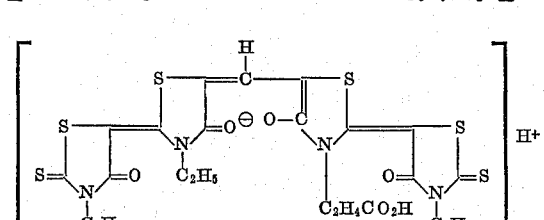
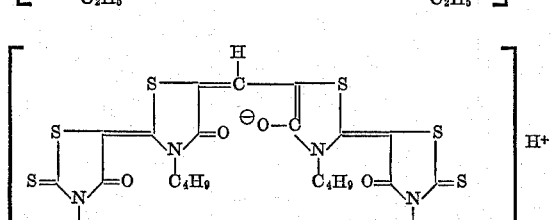
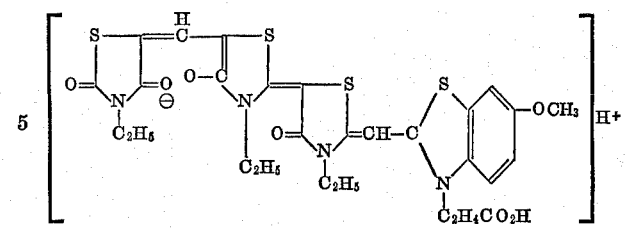
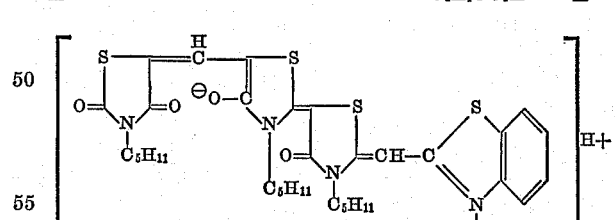
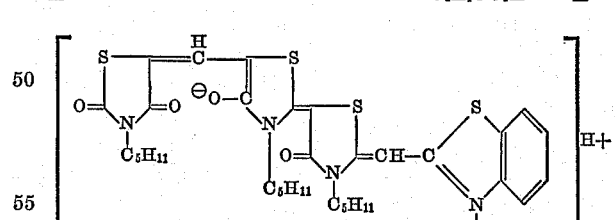
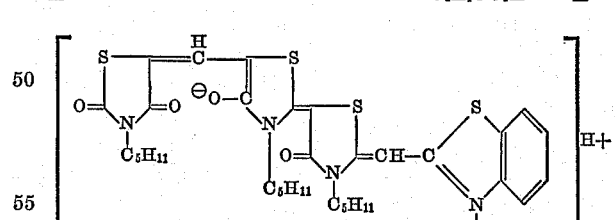
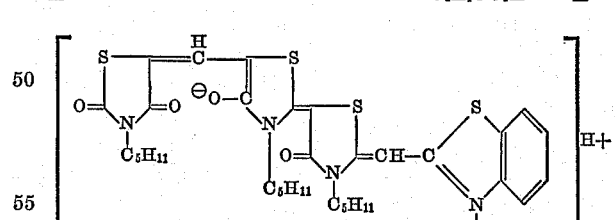
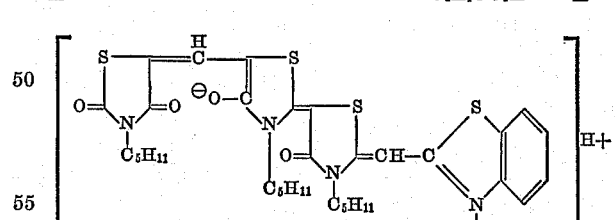

As indicated previously, the tetranuclear dyes of the present invention have found particular utility as sensitizers in electrophotographic systems as well as silver halide emulsions.

The novel tetranuclear dyes of the present invention are generally employed in electrophotographic layers and electrophotographic processes in which an electrostatic latent image is produced by utilizing the property of photoconduction (i.e., a variable conductivity dependent on the intensity of illumination). Such an electrophotographic reproduction process generally comprises one wherein a supported electrostatically charged photoconductive insulating layer is exposed and the resulting image subsequently developed with an electroscopic material. The improvement associated with such process is employing the novel tetranuclear dyes of the present invention as dyestuff sensitizers within the photoconductive insulating layer. Generally, the novel tetranuclear dyes are employed in an amount of from about 0.01% to about 5% by weight based on the photoconductive insulating layer, although slightly lower or greater amounts can be advantageously employed where desired for particular purposes. Thus, in such an electrophotographic process, the tetranuclear dyes of the present invention are employed as dyestuff sensitizers within a photoconductive insulating layer supported on a conductive support in the copy sheet, plate, or similar electrophotographic element.

The electrostatic latent image produced in the electrophotographic process may be produced in a conventional exposure operation, for example, by means of a lens-projected image or by contact-printing techniques, whereby a non-visible electrostatic charge pattern (the so-called electrostatic latent image) is created on a surface in which pattern the charge density at any point is related to the intensity of illumination obtaining at that point during the exposure. The latent image may be developed—i.e. rendered visible—by means of an electroscopic powder, such as a colored synthetic resin powder, and the resulting visible image may be fixed by rendering the powder permanently adherent to a support on which the image is desired, for example in suitable cases by heating to soften or melt the powder particles and/or the surface of the image support, or by application of an electric field, or with volatile solvents.

As noted above, in electrophotographic processes, such as embodied by the present invention, the electrostatic latent image is commonly formed on the surface of a photoconductive insulating layer carried on a support. For example, material comprising such support and photoconductive layer may be sensitized by applying a uniform surface charge to the free surface of the photoconductive layer, for example, by means of a corona discharge, which charge is retained owing to the substantial insulating character, i.e. the low conductivity, of the layer in the dark. On exposure as described above, the photoconductive property of the layer causes the conductivity to increase in the illuminated areas to an extent dependent on the intensity of illumination, whereby the surface charge in the illuminated areas leaks away, leaving the charge located in the unilluminated areas, thus constituting the aforementioned charge pattern or electrostatic latent image. The electrostatic latent image can be developed (i.e. rendered visible) by means of an electroscopic powder which adheres to the charged areas, particularly if the powder carries a charge of opposite polarity to that of the charge on the photoconductive material. Such opposite charge may be obtained by using the powder in admixture with a carrier such that the powder becomes suitably charged triboelectrically. A suitable developer may consist of a toner, such as a pigmented resin, and a carrier such as glass beads, and the powder image produced may be rendered permanent ("fixed") by, for example, softening such resin toner by heat so that it adheres to a support carrying the powder image—which may be the original photoconductive material, or a separate support to which the powder image can have been transferred. Liquid as well as powdered toner systems are applicable.

Materials generally known for the preparation of photoconductive insulating layers employed in electrophotographic reproduction processes include, for example, selenium, sulfur, zinc oxide and organic substances such as anthracene or anthraquinone. In addition, in recent years various organic heterocyclic materials have been developed which possess the property of acting as photoconductive materials employed in the photoconductive insulating layers utilized in electrophotographic processes. Thus, for example, some of these newly developed, heterocyclic materials include aryl furans, aryl thiophenes and aryl pyrroles such as shown in U.S. Pat. 3,174,854, N-disubstituted benzylideneazines as shown in U.S. Pat. 3,290,147, 2,5-bis(para-aminophenyl)-1,3,4-oxadiazole compounds such as shown in U.S. Pat. 3,189,447, and compounds having a pyrozoline nucleus as illustrated by U.S. Pat. 3,180,729. Accordingly, the novel tetranuclear methine dyes of the present invention which are suitably employed as dyestuff sensitizers in electrophotographic systems, can be employed advantageously in any of the aforementioned or similar photoconductive materials employed in photoconductive insulating layers.

The photoconductive insulating layers in which the tetranuclear methine dyestuff sensitizers of the present invention are incorporated are generally prepared as dispersions of the photoconductive material and dyestuff sensitizer in a solvent with the resultant dispersion applied to a suitable support, e.g. paper, aluminum plate, plastic, etc. In some instances, the photoconductive substances which are sensitized in accordance with the present invention by the employment of the novel tetranuclear methine dyes are used in the electrophotographic product and process in association with clear resinous polymeric binders having high dielectric characteristics. Such materials include, for example, polystyrene, polyvinyl chloride, polyvinylacetate, polyvinylidenechloride, polyvinyl acetals, polyvinylethers, polyacrylic esters, or any other natural or synthetic polymeric substance having the proper electrical characteristics. Thus, in the preparation of the photoconductive insulating layer employing the photoconductive material and sensitizing dyestuff of the present invention in association with such a clear, resinous polymeric binder, such materials are generally dissolved together in an organic solvent such as benzene, toluene, methylethylketone, methylethylbutylketone, chloroform, methylenechloride, etc. Such solvent solutions are coated on a suitable carrier or support as noted above, and when the solution is dried by evaporation of the solvent material, a solid solution which is transparent is formed.

As noted previously, the support or carrier for the photoconducted insulating layer may be any material suitably employed in electrophotographic processes. Thus, for example, such support may include aluminum or other metal plates or foils; glass plates; paper sheets or webs; or plastic foils, especially foils made of electrically conductive resins. If paper is to be used as a support for the photoconductive layer, it is preferable that it shall have been treated against penetration by the photoconductive insulating coating solution, e.g. by treatment with methylcellulose in aqueous solution, polyvinyl alcohol in aqueous solution, etc. Of course, all of such support and carrier layers as well as the method of treating the same, and all of the photoconductive insulating materials discussed above are well known in the art of electrophotographic processes. In this respect, the present invention comprises an improvement in such electrophotographic processes and materials by providing a novel dyestuff sensitizer employed within the photoconductive insulating layer in an amount of from about 0.01% to about 5% by weight, and preferably from about 1% to about 3% by weight based on the weight of the photoconductive insulating material.

In this respect, although the photoconductive insulating layer when charged in accordance with the electrophotographic process is slightly sensitive to light in the visible spectrum, it has been found generally necessary to extend the spectral sensitivity of such photoconductive materials into the visible part of the spectrum by the addition of a dyestuff sensitizer. Conventionally, such dyestuff sensitizers which have been found applicable are the triarylmethane dyes, xanthene dyes, thiazine dyes, acridine dyes, quinoline dyes, quinone dyes, anthraquinone dyes and cyanine dyes. The use of the novel tetranuclear methine dyes of the present invention within the photoconductive insulating layer as a dyestuff sensitizer in the electrophotographic process, however, has provided a distinct improvement over the use of such conventionally employed sensitizing materials in that, in addition to being capable of extending the spectral sensitivity of the photoconductive material by at least 50%, the dyestuff sensitizers employed in accordance with the present invention do not have associated with them the effect of producing fading or bleaching of the background of the photographic reproduction which effect is generally associated with previously employed materials.

In addition to the utility of the novel tetranuclear methine dyes of the present invention as dyestuff sensitizers in electrophotographic systems, the novel compounds of the present invention can also be utilized as sensitizers in conventional silver halide and similar photographic emulsions. Here again, the novel tetranuclear methine dyes are utilized for controlling or modifying the spectral sensitivity of the photographic emulsions. In this way, the novel compounds of the present invention are utilized for extending the spectral sensitivity of photographic silver halide emulsions, the natural sensitivity of light of which is restricted to a short range of wavelengths in the ultraviolet and/or violet and/or blue regions of the spectrum, to light of other wavelengths or to enhance the natural sensitivity in the well-defined part of the spectrum, e.g. in the blue range.

For optically sensitizing photographic silver halide emulsions by using one or more of the tetranuclear methine dyes of the present invention, the dye or dyes can be incorporated in the photographic emulsion by one of the methods customarily employed in the art. Thus, for example, it is sometimes convenient to add the dyestuff sensitizer to the emulsion in the form of a solution of the same in an appropriate solvent. The sensitizers are advantageously incorporated in the finished, washed emulsions and should be uniformly distributed throughout such emulsions. The concentration of the dyestuff sensitizers in the silver halide emulsion can vary widely, for example, from about 0.001% to about 5% by weight of the total emulsion composition. Preferably, however, the amount of tetranuclear methine dye in the photographic silver halide emulsion will vary from about .1% to 3% by weight, although greater or lesser amounts can be advantageously employed according to the effect desired.

In addition, the tetranuclear methine dyes of the present invention may, if desired, also be added to the emulsion by the well-known expedient of bathing the coated emulsion in a solution of the sensitizer.

In preparing the photographic emulsions according to the invention, the usual addenda such as antifogging agents, stabilizers, anti-bronzing agents, hardeners, wetting agents, plasticizers, development accelerators, color couplers, fluorescent brighteners and ultraviolet screening compounds can moreover be incorporated in the emulsion in the manner customarily employed in the art.

Emulsions sensitized with the novel tetranuclear dyes can be coated in the usual manner on a suitable support such as glass, cellulose derivative film, resin film or paper.

While the dyestuff sensitizers of the present invention are generally incorporated in silver halide emulsions containing gelatin as a binding agent so as to extend the spectral sensitivity thereof, such tetranuclear methine dyes can also be included in other photographic emulsions such as, for example, gelatino silver chlorobromide, gelatino silver bromide, gelatino silver bromoiodide, and gelatino silver chlorobromoiodide. Photographic emulsions containing water-permeable colloids other than gelatin, such as agar-agar, zein, collodion, water-soluble cellulose derivatives, polyvinyl alcohol or other hydrophilic synthetic or natural resins or polymeric compounds, may equally well be sensitized according to the present invention.

In addition to optically sensitizing and extending the spectral sensitivity of black and white photographic emulsions, the novel tetranuclear methine dyes of the present invention are similarly useful as dyestuff sensitizers for color photographic emulsions and X-ray emulsions employed in X-ray photography. In addition, the dyestuff sensitizers of the present invention need not be employed alone in the photographic silver halide emulsion, but can be employed in conjunction with other conventional sensitizing agents so as to produce a super-sensitizing effect.

The present invention will now be illustrated by reference to the following specific examples. It is to be understood, however, that such examples are presented for purposes of illustration only and the present invention is in no way to be deemed as limited thereto.

EXAMPLE I

The preparation of 5-(3-ethyl-2-methylthio-4-oxo-5-thiazolinylidene)methyl - 3 - ethyl - 4 - hydroxy-2-methylthiothiazoline anhydro salt

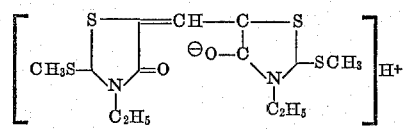

6.50 g. (15 mmoles) of the complex salt of bis-[5-(3-ethylrhodanine-methane) cyanine] were pre-heated with 30 ml. of purified chlorobenzene in a constant temperature bath (131° C.) for 10 minutes with occasional stirring. After the addition of 30 ml. of freshly purified dimethyl sulfate the mixture was heated for an additional five minutes only. After it cooled, the reaction mixture was triturated three times with ethyl ether and the solid after standing overnight was filtered. The yield was quantitative as a dark brown solid without any purification.

EXAMPLE II

The preparation of tetranuclear dye: 2-(3-carboxyethyl-6-methoxy - 2 - benzothiazolinylidene)methyl-5-[2-(3-carboxyethyl - 6 - methoxy - 2 - benzothiazolinylidene) methyl-3-ethyl-4-oxo - 5 - thiazolinylidene)methylene-3-ethyl-4-hydroxide thiazolinium hydroxide inner salt

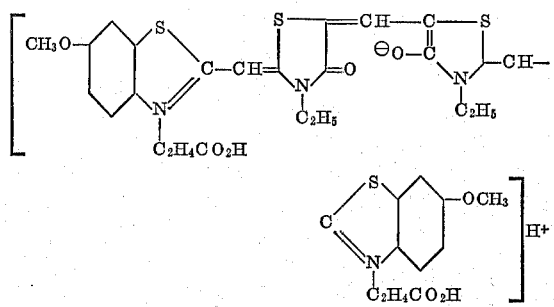

0.18 g. (0.5 mmole) of the quaternary salt of Example 1, 0.36 g. (0.95 mmole) of 3-carboxyethyl-6-methoxy-2-methylbenzothiazolium iodide and 5 ml. of isopropanol were mixed thoroughly before the addition of 0.4 ml. of triethylamine. The mixture was stirred manually for two minutes and heated on a steam bath for three minutes with stirring after it boiled. The reaction mixture was then diluted with three volumes of water, neutralized with glacial acetic acid (10% excess) and the whole was chilled in ice water for 20 minutes. After it was filtered, the dye was boiled three times with methanol. Some 0.20 g. (55% yield) of photographic grade of titled dye was obtained as a greenish powder melting at 220–224° C. with decomposition.

EXAMPLE III

Similar dyestuffs were prepared by following the procedure of Example II, except that the 3-carboxyethyl-6- methoxy-2-methylbenzothiazolium iodide was replaced by an equivalent amount of the following compounds:

(A) 3-carboxyethyl-2-methylbenzothiazolium iodide
(B) 3-carboxyethyl-6-methoxy-2-methylbenzoselenazolium iodide
(C) 3-carboxyethyl-2-methylbenzoselenazolium iodide
(D) 3-carboxyethyl-5-ethoxy-2-methylbenzothiazolium iodide
(E) 3-carboxyethyl-5-propyl-3-methylbenzothiazolium iodide.

In all cases, a substantially equivalent yield of a photographic grade dye was obtained.

EXAMPLE IV

The preparation of the tetranuclear dye: 2-(3-carboxyethyl - 6 - methoxy-2-benzothiazolinylidene)methyl-5-[2 - (3-carboxyethyl-6-methoxy - 2 - benzothiazolinylidene)methyl-3-ethyl-4-oxo - 5 - thiazolinylidene]methylene - 3 - carboxyethyl-4-hydroxide thiazolinium hydroxide inner salt

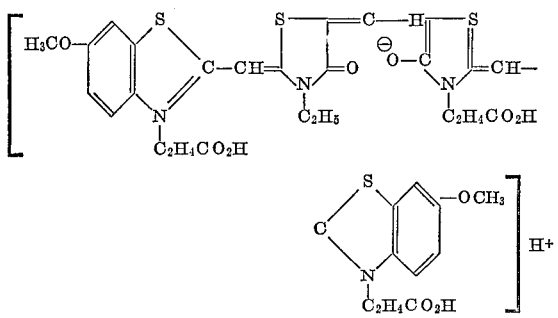

The above tetranuclear dye was prepared by following the procedure of Example II with the exception that the quaternary salt of Example I was replaced by an equal amount of the salt 5 - (3-ethyl-2-methylthio-4-oxo-5-thiazolinylidene)methyl-3-carboxyethyl - 4 - hydroxy - 2-methylthiothiazoline anhydro salt. A substantially equivalent yield of the photographic grade dye was produced.

EXAMPLE V

A dyestuff of the formula:

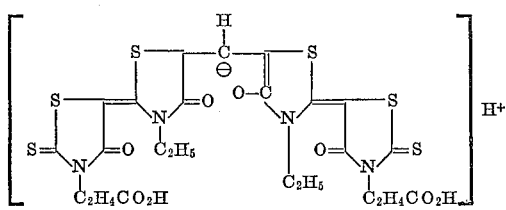

was prepared by following the procedure of Example II, except that the 3-carboxyethyl - 6 - methylbenzothiazolium iodide was replaced with an equivalent amount of 3-carboxyethylrhodanine. Again, a substantially equivalent yield of the tetranuclear dye of photographic grade was prepared.

EXAMPLE VI

Example V was repeated except that 3-carboxymethylrhodanine was employed in lieu of 3-carboxyethylrhodanine. Again, a substantially equivalent yield of the photographic grade tetranuclear dye was produced.

EXAMPLE VII

Example V was again repeated except that an equivalent amount of 3 - ethylrhodanine was employed in lieu of 3 - carboxyethylrhodanine. Again, a substantially equivalent yield of the desired tetranuclear dye was produced.

EXAMPLE VIII

Example V was repeated except that 5-(3-ethyl-2-methylthio - 4 - oxo - 5 - thiazolinylidene)methyl - 3 - ethyl- 4 - hydroxy - 2 - methylthiothiazoline anhydro salt was replaced with a substantially equivalent amount of 5-(3-ethyl - 2 - methylthio-4-oxo - 5 - thiazolinylidene)methyl-3 - carboxyethyl - 4 - hydroxy - 2 - methylthiothiazoline anhydro salt. A substantially equivalent yield of the desired tetranuclear dye of photographic grade was produced.

EXAMPLE IX

Example VII was repeated except that 5 - (3 - ethyl-2-methylthio - 4 - oxo - 5 - thiazolinylidene)methyl - 3-ethyl - 4 - hydroxy - 2 - methylthiothiazoline anhydro salt was replaced with a substantially equivalent amount of 5 - (3 - ethyl - 2 - methylthio - 4 - oxo - 5 - thiazolinylidene)methyl - 3 - carboxyethyl - 4 - hydroxy - 2 - methylthiothiazoline anhydro salt. The desired tetranuclear dye was produced in substantially equivalent yield as produced in the examples above.

EXAMPLE X

The preparation of 5-(3-ethyl - 2,4 - dione-5-thiazolinylidene)-methyl - 2 - [2-(3-carboxyethyl - 6 - methoxy-2-benzothiazolinylidene)-methyl - 3 - ethyl - 4 - oxo-5-thiazolinylidene] - 3 - ethyl - 4 - hydroxide-thiazolinium hydroxide inner salt

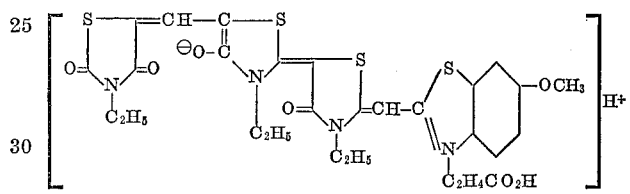

0.25 g. (0.56 mmole) of 2-(3-ethyl - 4 - oxo-2-thio-5-thiazolinylidene) - 5 - (3-ethyl - 2,4 - dione-5-thiazolinylidene)-methylene - 3 - ethyl - 4 - hydroxide-thiazolinium hydroxide inner salt was preheated wth 2 ml. of chlorobenzene in a constant temperature (131° C.) with the subsequent addition of 2 ml. of dimethyl sulfate. The mixture was then heated for 5 mins. After it cooled, the reaction mixture was triturated three times with ethyl ether. This was reacted directly without purification with 0.16 g. (0.42 mmole) of 3-carboxyethyl - 6 - methoxy-2-methylbenzo-thiazolium iodide in 5 ml. of isopropanol and 0.4 ml. of triethylamine. The mixture was heated on a steam bath with stirring for three minutes. The reaction mixture was treated in the same manner as described in Example II. A yield of 0.12 g. (32.3% yield) of the unsymmetrical tetranuclear dye melting at 277–80° C. with decomposition was obtained.

EXAMPLE XI

The procedure of Example X was repeated except that the 3 - carboxyethyl - 6 - methoxy - 2 - methylbenzothiazolium iodide was replaced with an equivalent amount of the following compounds:

(A) 3-carboxyethyl-2-methylbenzothiazolium iodide
(B) 3-carboxyethyl-6-methoxy-2-methylbenzoselenazolium iodide
(C) 3-carboxyethyl-2-methylbenzoselenazolium iodide
(D) 3-carboxybutyl-6-methoxy-2-methylbenzothiazolium iodide.

Here again, substantially equivalent yield of photographic grade tetranuclear dyes of the unsymmetrical type were prepared.

EXAMPLE XII

The following experiment was conducted in order to illustrate the sensitizing property of the novel tetranuclear dyes when employed in electrophotographic systems.

A solution was prepared by admixing with stirring 260 ml. of toluene, 0.09 g. of cobalt naphthanate and 0.09 g. of manganese naphthanate. After the formation of a clear solution, 91 g. of an electrostatic coating, i.e. Epitex 1311 (Celanese Corporation) comprising a mixture of a polyester of bisphenol-A-polyglycidyl ether, soya fatty acids, and dimeric linseed fatty acids was added with stirring. In addition, 18.2 g. of a low molecular weight (approximately 400), low melting point (approximately 75° C.) polystyrene resin were added to the system. Subsequently, 454 g. of zinc oxide were added to the system with stirring and milling until a smooth homogeneous composition was prepared.

To such a smooth, homogeneous, milled composition, 20 mg. of the sensitizing dyes of Example II, III(A), V, VI, VII and IX dissolved in methanol were added. The compositions including the sensitizing tetranuclear dyes of the present invention were then stirred for 30 minutes to provide a homogeneous distribution of the sensitizing dye in the conductive coating and such homogeneous composition was then coated on Weyerhaeuser Copybase G conductive paper with drying to a dried coating weight of 20 pounds per 3000 square feet.

The conductive paper thus coated with a conductive coating including the sensitizing tetranuclear dyes of the present invention were then evaluated by means of spectrograms with the prints being evaluated in a Bruning Copytron 2000. The prints and spectrograms were then compared to those prepared from an unsensitized coating, such comparison indicating a sensitization in the long wavelength region, i.e. red region, of at least 50%. This, therefore, establishes the utility of the tetranuclear dyes of the present invention as optical dyestuff sensitizers in electrophotographic processes.

In a comparison with conventional dyestuff sensitizers generally employed in electrophotographic processes, compositions were prepared as above except utilizing dyestuff sensitizers Bromphenol Blue, Fluorescin, Eosin, Rose Bengal and carbocyanine dyes. While the above conventional dyestuff sensitizers did have the effect of sensitizing or extending the spectral sensitivity of the photoconductive material, such dyestuff sensitizers provided a fading or bleaching of the background image. Such fading or bleaching of the background image upon long exposure to light was far less pronounced when employing the dyestuff sensitizers of the present invention.

Accordingly, it should be clear from the above that the novel tetranuclear dyes of the present invention have found exceptional utility as dyestuff sensitizers, particularly in electrophotographic processes wherein such dyestuff sensitizer is incorporated within a supported conductive layer. In this respect, the dyestuff sensitizers of the present invention have been found capable of providing an unexpectedly great sensitization of the spectral sensitivity of the conductive material employed in the electrophotographic processes while eliminating the deficiencies associated with the effect of fading or bleaching of the background image.

Thus, while the present invention has been described primarily with respect to the foregoing specific examples, it should be understood that the present invention is in no way to be deemed as limited thereto but should be construed as broadly as all or any equivalents thereof.

We claim:

1. An electrophotographic element comprising a photoconductive insulating layer selected from the group consisting of selenium, sulfur, zinc oxide, anthracene or anthraquinone on a conductive support, said photoconductive insulating layer containing from about 0.01 to about 5.0% by weight of a dyestuff sensitizer of the formula:

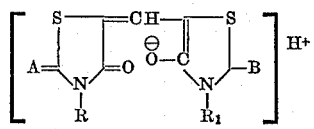

wherein

A is selected from the group consisting of (1) 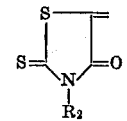

and (2) $O=$ 

and

B is selected from the group consisting of (1) and (3) 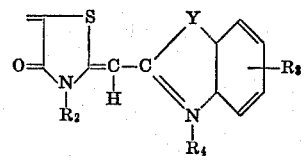

R is alkyl;
$R_1$, $R_2$, and $R_4$ are selected from the group consisting of lower alkyl and carboxy lower alkyl, at least one of $R_1$, $R_2$ and $R_4$ being carboxy lower alkyl;
$R_3$ is selected from the group consisting of hydrogen, lower alkyl and lower alkoxy; and
Y is selected from the group consisting of Se and S; such compounds being characterized that when A is (1), B is (1); and when A is (2), B is (3).

2. An electrophotographic reproduction process wherein an electrophotographic element as defined in claim 1 is uniformly charged, exposed, and the resulting image subsequently developed with an electroscopic material.

3. A light-sensitive silver halide photographic emulsion comprising from about 0.001 to about 5% by weight of the emulsion of a dyestuff sensitizer of the formula:

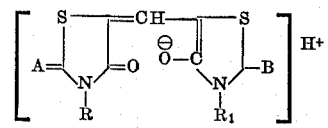

wherein

A is selected from the group consisting of (1) 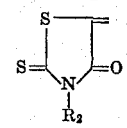

and (2) $O=$ ;

and

B is selected from the group consisting of (1) and (3) 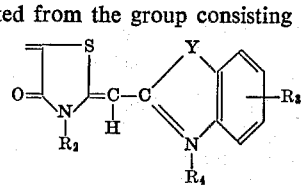

R is alkyl;
$R_1$, $R_2$ and $R_4$ are selected from the group consisting of lower alkyl and carboxy lower alkyl, at least one of $R_1$, $R_2$ and $R_4$ being carboxy lower alkyl;
$R_3$ is selected from the group consisting of hydrogen, lower alkyl and lower alkoxy; and
Y is selected from the group consisting of Se and S; such compounds being characterized that when A is (1), B is (1); and when A is (2), B is (3).

4. A photographic element comprising a base support coated with a light-sensitive photographic emulsion as defined in claim 3.

5. An electrophotographic element comprising an organic heterocyclic photoconductive insulating layer on a conductive support, said photoconductive insulating layer containing from about 0.01 to about 5.0% by weight of a dyestuff sensitizer of the formula:

(1) 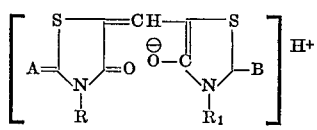 H⁺ wherein A is selected from the group consisting of

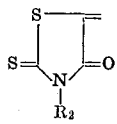

and (2) 

and B is selected from the group consisting of (1) and (3)

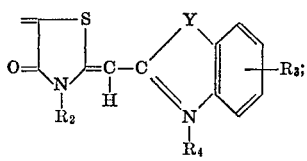

R is alkyl; $R_1$, $R_2$, and $R_4$ are selected from the group consisting of lower alkyl and carboxy lower alkyl, at least one of $R_1$, $R_2$ and $R_4$ being carboxy lower alkyl; $R_3$ is selected from the group consisting of hydrogen, lower alkyl and lower alkoxy; and Y is selected from the group consisting of Se and S; such compounds being characterized that when A is (1), B is (1); and when A is (2), B is (3).

6. An electrophotographic reproduction process wherein an electrophotographic element as defined in claim 5 is uniformly charged, exposed, and the resulting image subsequently developed with an electroscopic material.

References Cited
UNITED STATES PATENTS

| | | | |
|---|---|---|---|
| 2,388,963 | 11/1945 | Fry et al. | 96—128 X |
| 2,454,629 | 11/1948 | Brooker | 96—128 X |
| 2,518,731 | 8/1950 | Thompson | 260—240.1 |
| 2,586,164 | 2/1952 | Hensley | 96—128 |
| 3,152,905 | 10/1964 | Gaspar | 260—240.1 X |
| 3,379,533 | 4/1968 | Jenkins et al. | 260—240.2 X |
| 3,622,316 | 11/1971 | Bird et al. | 96—1.7 |
| 3,630,749 | 12/1971 | Webster et al. | 96—1.7 X |
| 3,702,767 | 11/1972 | Ohlschlager et al. | 96—1.7 X |

FOREIGN PATENTS

| | | | |
|---|---|---|---|
| 540,578 | 10/1941 | Great Britain | 260—240.1 |

ROLAND E. MARTIN, JR., Primary Examiner

U.S. Cl. X.R.

96—1.6, 128